United States Patent

[11] 3,617,013

| [72] | Inventors | Dianne B. Ainslie;<br>Arthur H. Crapsey, both of Rochester, N.Y. |
|---|---|---|
| [21] | Appl. No. | 837,279 |
| [22] | Filed | June 27, 1969 |
| [45] | Patented | Nov. 2, 1971 |
| [73] | Assignee | Eastman Kodak Company<br>Rochester, N.Y. |

[54] CARTRIDGE
9 Claims, 9 Drawing Figs.

[52] U.S. Cl. ..................................................... 242/197,
242/71.1, 352/78
[51] Int. Cl. ..................................................... G11b 23/10
[50] Field of Search ........................................... 242/197,
198, 199, 200, 71.1, 71.2, 194; 206/52, 59;
352/72, 78

[56] References Cited
UNITED STATES PATENTS

| 2,484,248 | 10/1949 | Roehrl ............................ | 242/71.1 |
| 3,190,577 | 6/1965 | Allen et al. ..................... | 242/71.1 |
| 3,346,210 | 10/1967 | Carstensen et al............ | 206/52 F UX |
| 3,432,111 | 3/1969 | Ryder ............................. | 242/199 |
| 3,463,409 | 8/1969 | Stark .............................. | 242/71.1 |
| 3,495,787 | 2/1970 | Wallace ......................... | 242/199 |

*Primary Examiner*—George F. Mautz
*Attorneys*—Robert W. Hampton and G. Herman Childress ABSTRACT: A cartridge has two separate parts with recesses therein jointly defining a chamber for a reel of film or other web material when the cartridge parts are assembled together. Cooperating latch structure on the cartridge parts includes at least one opening in a wide wall of one cartridge part which is adapted to receive a latch portion projecting from a wide wall of the other cartridge part. In assembling the cartridge the latch portion on the second cartridge part is deflected into the recess in the first cartridge part and then snaps into the latch opening in the first cartridge part. In a preferred embodiment of the invention two separate latch members project from a second wide wall of the second cartridge part and enter two spaced latch openings in a corresponding wide wall of the first cartridge part. Provision may be made for vertical stacking of horizontally positioned cartridges as well as for side-by-side positioning of the cartridges in adjacent vertical planes.

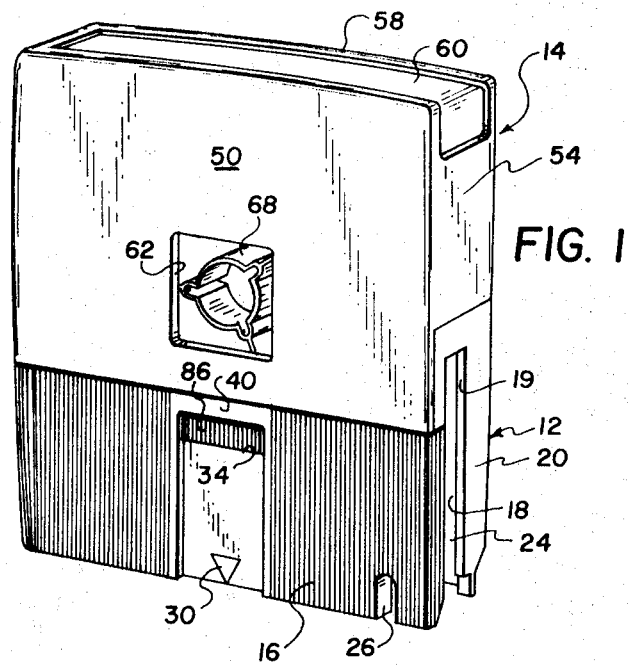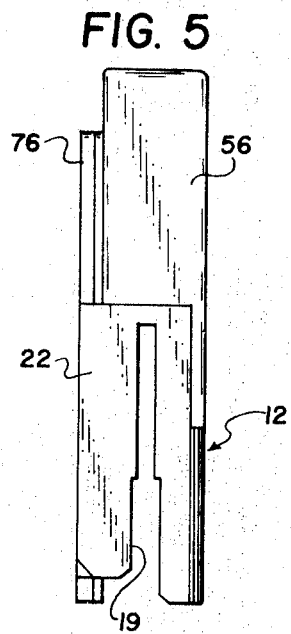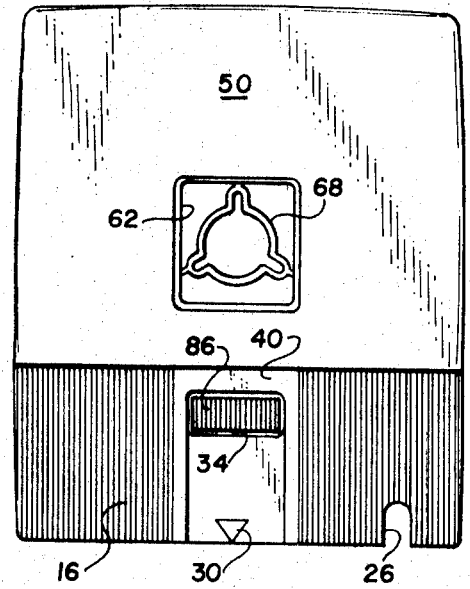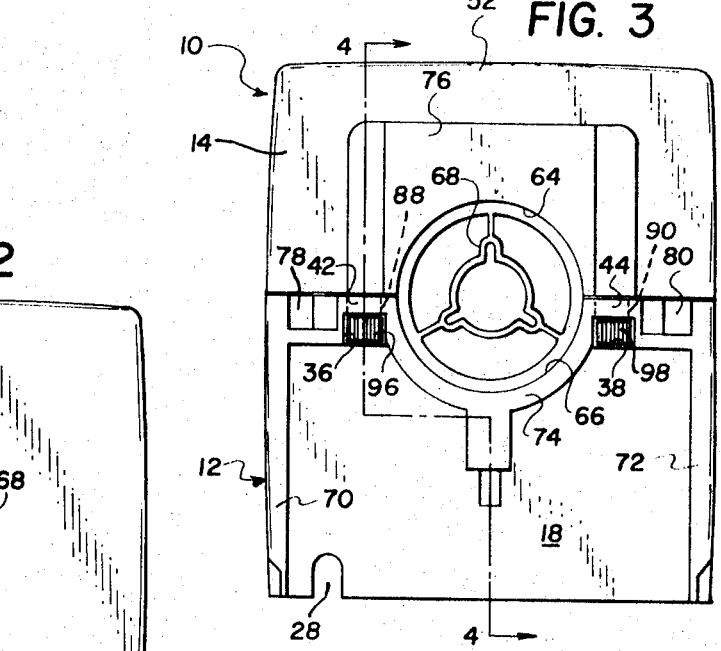

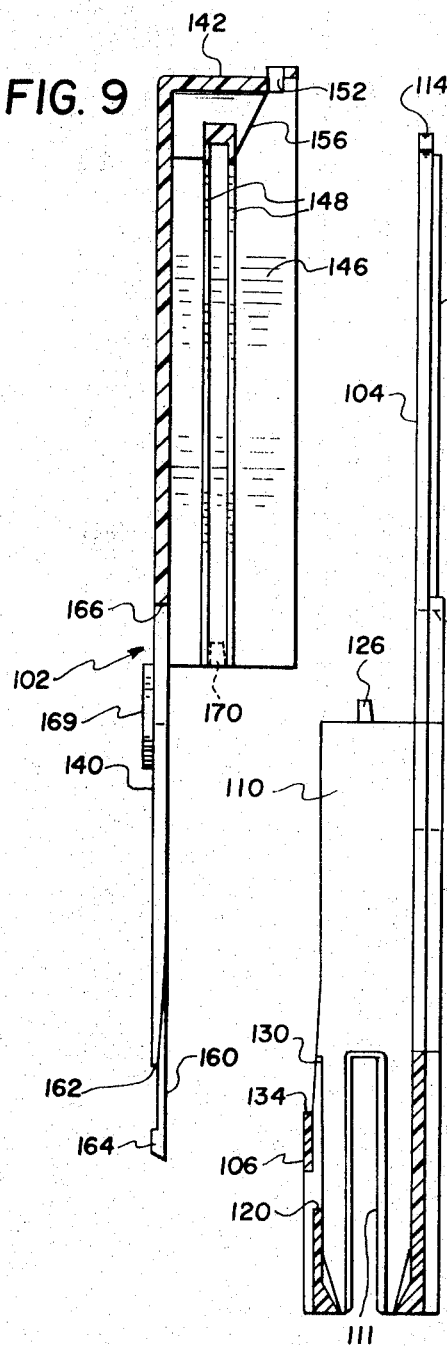
FIG. 9
FIG. 8
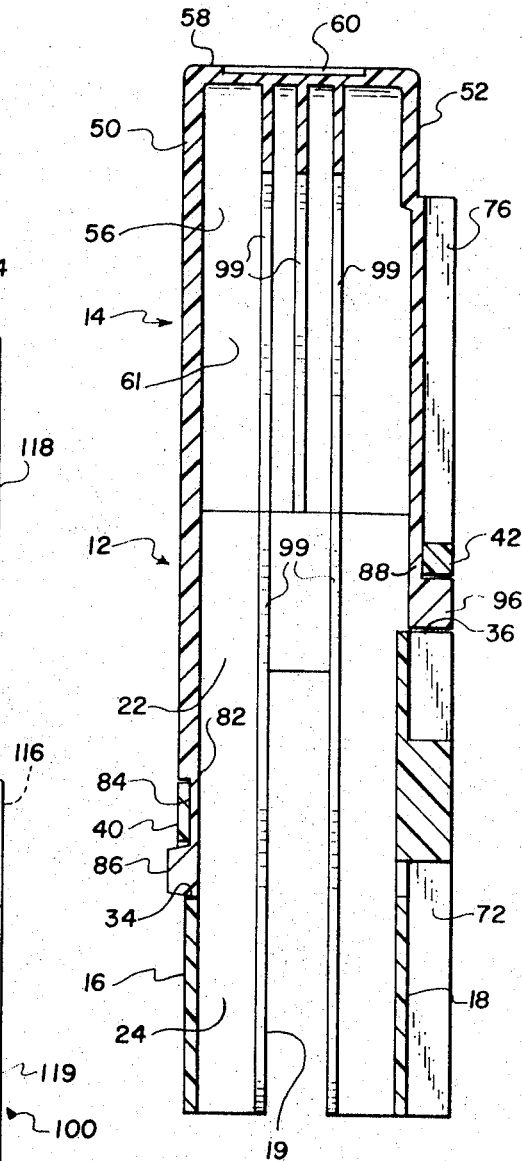
FIG. 4
DIANNE B. AINSLIE
ARTHUR H. CRAPSEY
INVENTORS
BY J. Herman Childress
Robert W. Hampton
ATTORNEYS

PATENTED NOV 2 1971          3,617,013

DIANNE B. AINSLIE
ARTHUR H. CRAPSEY
INVENTORS

BY *J. Herman Childress*
*Robert W. Hampton*
ATTORNEYS

CARTRIDGE

CROSS-REFERENCES TO RELATED APPLICATIONS

Reference is made to commonly assigned copending U.S. Pat. application Ser. No. 731,562 entitled "Cartridge and Means for Locating a Cartridge on a Projector or the Like," filed in the name of John J. Bundschuh, now U.S. Pat. No. 3,547,373; and U.S. Pat. application Ser. No. 736,524 entitled "Cartridge," also filed in the name of John J. Bundschuh.

BACKGROUND OF THE INVENTION

1. Field of the Invention

This invention relates to a cartridge that receives a reel containing an elongate strip of web material (such as motion picture film), the cartridge being positionable on a motion picture projector or the like for removal of the film from the cartridge and for subsequent rewinding of film into the cartridge. More specifically, the invention relates to cartridges for loosely containing reels of film and wherein provision is made for receipt of a projector spindle through the cartridge and into an opening in the reel during loading of a cartridge on a projector.

2. Description of the Prior Art

In the related copending U.S. patent applications Ser. No. 731,562 and Ser. No. 736,524, projector cartridges are disclosed comprising two cartridge parts having recesses jointly defining a chamber for a reel of film. Said cartridges have structures thereon adapted to cooperate with structures on a projector for substantially exactly locating the cartridge with respect to the projector. The cartridges disclosed in said applications comprise latching structure carried by the two cartridge parts along relatively narrow side edges thereof. The latch structure on these cartridges has proved satisfactory in operation. However, some difficulty may be experienced in manipulating the latch structure to effect engagement or disengagement of the latch for assembling or disassembling the cartridge parts. Moreover, interlocking structures provided along the interface of the cartridge may complicate assembly of the cartridge parts.

SUMMARY OF THE INVENTION

Accordingly, it is an object of the invention to provide an improved cartridge structure which is more easily assembled and disassembled, and to simplified and improved means for latching cartridge parts together to facilitate assembly or disassembly of the parts. Another object of the invention is to minimize or eliminate interlocking structures along the interface between cartridge parts which might interfere with quick assembly of the cartridge parts.

These and other objects of the invention are achieved by cartridges manufactured in accordance with this invention. Such a cartridge includes two cartridge parts, one of which has a sidewall containing latch structure adapted to engage with cooperating latch structure on a sidewall of the other cartridge part for fastening the parts together and for permitting easy disassembly of parts. Preferably, the latch structure on each cartridge part is located on a relatively wide, flat sidewall of the cartridge which facilitates flexing of the latch structure during latching and unlatching operations.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIG. 1 is a perspective view of a cartridge according to the present invention;

FIG. 2 is an elevation view of the side of the cartridge shown in FIG. 1;

FIG. 3 is an elevation view of the opposite side of the cartridge;

FIG. 4 is an enlarged section view taken along line 4—4 of FIG. 2;

FIG. 5 is an elevation view of the left side of the cartridge as viewed in FIG. 1;

FIGS. 8 and 9 are views partially in elevation and partially in section taken along lines 8—8 and 9—9 of FIGS. 6 and 7, respectively.

DESCRIPTION OF THE PREFERRED EMBODIMENTS

Figure 6:
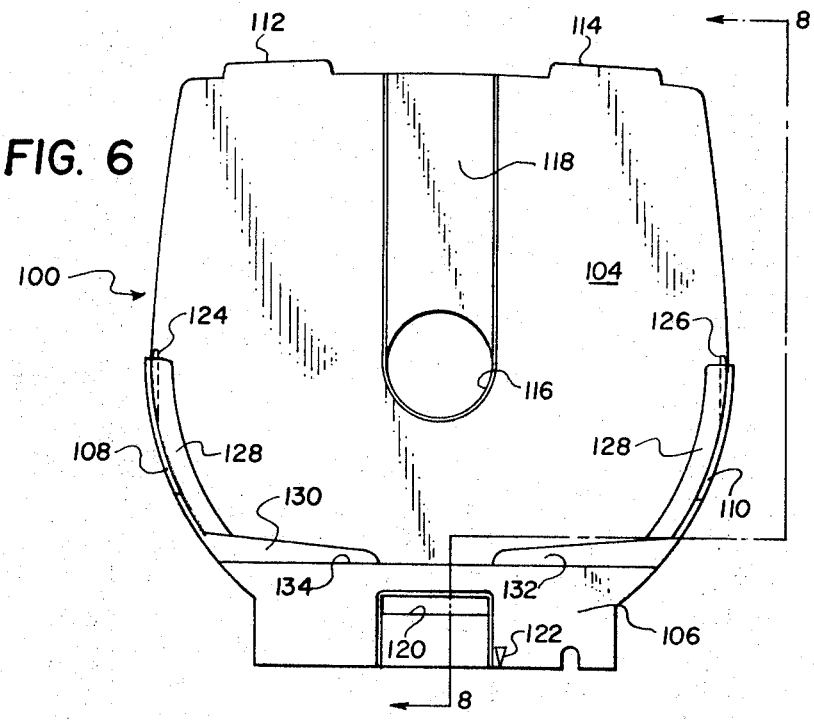
FIG. 6 is an elevation view of one cartridge part according to another embodiment of the invention.

Because cartridges for motion picture projectors are well known, the present description will be directed in particular to elements forming part of, or cooperating more directly with, the present invention, cartridge elements not specifically shown or described herein being understood to be selectable from those known in the art.

Referring now to FIGS. 1–3 of the drawings, a cartridge according to this invention is generally designated 10 and comprises two separate cartridge parts 12 and 14 which may be referred to as a base or lower part and a cover part, respectively. Part 12 comprises front and rear sidewalls 16 and 18, respectively, which are relatively wide, substantially flat rectangular walls. Walls 16 and 18 are joined at opposite side edges thereof of edge walls 20 and 22. The walls 16 and 18 are thin, and they are made from a material which permits them to flex toward each other but spring back to their molded shape. The walls jointly define a recess 24 extending substantially entirely across the cartridge and opening at the upper end thereof into a similar recess (described later) in the upper cartridge part 14. Cartridge part 12 has a slot 19 extending through edge wall 20, the bottom of the cartridge and edge wall 22. A film-feeding mechanism (not shown) of a projector can enter the cartridge through this slot and engage a roll of film on a reel therein for removing film from the cartridge through a portion of the slot in the bottom of the cartridge. An asymmetrically located notch 26 in wall 16 and a corresponding notch 28 in wall 18 are aligned with each other and are intended to cooperate with a boss (not shown) on a projector to prevent reverse mounting of the cartridge on the projector. Slot 19 and notches 26 and 28 are described in more detail in the beforementioned copending applications. Suitable indicia, shown as an arrow 30, on the lower edge of cartridge part 12 is aligned with corresponding indicium (not shown) on a projector for positioning of the cartridge on the projector. The arrow 30 or other alignment indicia on the cartridge may be molded on the face of the cartridge, painted thereon, or may be provided in any other suitable manner.

As best seen in FIGS. 1 and 5, the edge walls 20 and 22 of cartridge part 12 are stepped from the front sidewall 16 to the rear sidewall 18 with the stepped portions being complementary to corresponding edge wall portions of the upper cartridge part 14 so that the edge walls on the two cartridge parts mate with each other when the parts are properly assembled together. This stepped configuration of the edge walls together with the act that the rear wall 18 is higher than the front wall 16, helps prevent any attempt to improperly assemble the cartridge parts. Also, the stepped edge wall construction strengthens the cartridge at the ends thereof without unduly limiting flexing in the area of the latching structure described later.

An elongate, rectangular opening 34 extends through the front wall 16 and is adapted to receive a latch member on upper cartridge part 14. Similarly, two spaced, generally rectangular openings 36 and 38 (FIG. 3) are provided in rear wall 18 for receiving latch portions on the backwall of cartridge part 14. Openings 34, 36 and 38 are each adjacent to the upper edge of the respective sidewall of cartridge part 12, but such openings are spaced from the adjacent edge of the cartridge part by latching bars designated 40, 42 and 44, respectively. As shown in FIG. 4, these latching bars are recessed from the adjacent faces of the inner surfaces of sidewalls 16 and 18.

The upper cartridge part 14 comprises a front sidewall 50 which is spaced from and generally parallel to a rear sidewall 52. Walls 50 and 52 are joined at their side edges by edge walls 54 and 56 and at their upper edges by an edge or top wall 58. Wall 58 may be recessed as shown in FIG. 1 to accommodate a suitable label 60 used for identifying the film strip within the cartridge. The side and edge walls of part 14 are substantially rectangular in shape, as illustrated, and the lower edge of walls 54 and 56 are stepped to complement the adjacent or corresponding edge of walls 20 and 22 on the lower cartridge part so that the edge walls of the cartridge parts mate with each other when the parts are assembled together. The sidewalls, edge walls and top wall of cartridge part 14 jointly define a recess 61 (FIG. 4) which opens to the bottom of the part and which cooperates with recess 24 in the lower cartridge part to form a chamber for a reel of film.

Wall 50 has a generally rectangular-shaped opening 62 spaced from all side edges of the wall. Wall 52 has a semicircular notch or opening 64 along its lower edge which cooperates with a similar semicircular notch 66 in the upper edge of wall 18 of the lower cartridge part to jointly define a circular opening. As described in the beforementioned copending patent applications, opening 64 is adapted to receive a pin (not shown) projecting from the hub of a reel 68 when the reel is positioned within the cartridge. The reel pin is located at a diameter from the axis of rotation of the reel so that it can project through and rotate within the circular opening in the cartridge but cannot project through or rotate within the rectangular opening, thereby avoiding improper insertion of the reel within the cartridge. Moreover, because opening 62 is spaced from the lower edge of cartridge part 14, it is virtually impossible to incorrectly position the reel within the cartridge, i.e. with the pin within opening 62.

Means are provided on the cartridge exterior surface for locating or orienting the cartridge with respect to the motion picture projector. This orienting structure is best illustrated in FIG. 3 of the drawings and comprises ribs 70 and 72 at the side edges of the cartridge wall 18, a cross rib 74 extending between the ribs 70 and 72 along the upper edge of cartridge part 12, and a raised, generally rectangular portion 76 on wall 52 of cartridge part 14. Preferably, this orienting structure and the manner in which it cooperates with locating structure (not shown) on the projector are the same as that described in the beforementioned copending applications. The cartridge can be latched in position on the projector by latch members carried by the projector which are adapted to be received in openings 78 and 80 in wall 18.

Referring now to FIG. 4, cartridge part 14 has latching structure thereon adapted to be received in openings 34, 36 and 38 on part 12 for holding the cartridge parts in assembled relation. This latching structure comprises a flexible finger 82 projecting from the lower edge of wall 50. A portion of the finger 82 is cut away as shown at 84 with the cutaway portion being adapted to fit behind bar 40 on part 12 when the parts are assembled. At the lower end of finger 80 there is a latching portion designated 86 which is generally rectangular in shape and is adapted to fit within and substantially entirely fill the opening 34 below bar 40 in cartridge wall 16. Finger 82 is flexed inwardly into the recess 24 formed by the lower cartridge part during insertion of and removal of the latching member from opening 34.

The latching structure on cartridge part 14 further includes two latching fingers 88 and 90 projecting from wall 52 in spaced relation to each other. These fingers also have portions which fit behind bars 42 and 44, respectively, on wall 18. Latching portions 96 and 98 at the lower end of fingers 88 and 90, respectively, are adapted to enter and substantially fill the openings 36 and 38, respectively, in wall 18 when the parts are assembled. Fingers 88 and 90 are flexed inwardly to recess 48 during insertion and removal of the latching members into openings 36 and 38.

Because the latching structures on cartridge part 14 are located intermediate the ends of the relatively wide walls 50 and 52 of the cartridge, and because the cartridge walls are comparatively thin and flexible in the area of the latching structure, the latching fingers can be deflected inwardly into the recess 24 formed in the lower cartridge part during assembly and disassembly of the cartridge without unduly stressing the walls of the cartridge. In addition, each of the latching fingers is relatively narrow and sufficiently long to permit flexing of the fingers alone without damage thereto. Thus, the fingers may be flexed inwardly, the upper cartridge part moved into its assembled position on the lower cartridge part, and the latching fingers released to allow them to snap outwardly to engage the latching portions 86, 96 and 98 in their respective openings in the lower cartridge part.

Parts 12 and 14 preferably have rails 99 on the inner surfaces of the edge walls. These rails project into the space between reel flanges in the cartridge to limit clockspringing of film on the reel to the area between the reel flanges as described more fully in the beforementioned copending patent applications.

Referring now to FIGS. 6–9 of the drawings, another embodiment of the invention is shown which is particularly suitable for receiving comparatively large size rolls of film, such as rolls of 200- or 400-foot film lengths. This cartridge comprises a first cartridge part 100, which may be referred to as the base or lower portion of the cartridge, and a second cartridge part generally designated 102 which may be referred to as the upper or cover portion of the cartridge. Cartridge part 100, as well as the lower cartridge part 12 in the previously described embodiment may be made of materials which are not necessarily readily flexible. On the other hand, it is desirable to form the upper cartridge part 102 (and part 14) of a material capable of easily flexing to at least a limited extent, thereby permitting deflection of a latch member in a manner described hereinafter.

Cartridge part 100 has a wall 104 forming substantially one entire side of the cartridge. A second wall 106 on part 100 is relatively short and forms only a portion of a second side of the cartridge. Positioned between walls 104 and 106 and extending upwardly along wall 104 above wall 106 are edge walls 108 and 110. The edge walls hold walls 104 and 106 in substantially parallel relation and cooperate with such walls to jointly define a portion of a chamber for a reel of film (not shown). An elongate slot 111 is provided through the edge walls and the bottom of the cartridges for passage of a film-feeding mechanism and film.

Projecting from the upper edge of wall 104 (i.e. the edge opposite wall 106) are two spaced integrally formed tongue members 112 and 114 that form part of the latching structure for holding the two cartridge parts assembled. Wall 104 has a centrally located circular opening 116 for receiving a spindle of a motion picture projector. A rib 118 may be provided on wall 104 to limit flexing of the wall between its edge portions. Structure generally designated 119 may be provided on the outer surface of wall 104 for orienting the cartridge on a projector. Such orienting structure may be identical to that shown in FIG. 3 and in the beforementioned copending patent applications.

Wall 106 has an elongate, substantially rectangular opening 120 which is adapted to receive a latch member on part 102 in the manner described later. Wall 106 preferably includes an arrow 122 or other suitable marking indicium positionable in alignment with corresponding indicium on a projector for determining the position of the cartridge with respect to the projector. It will be observed that arrow 122 may be asymmetrically located, and such is especially desirable where, as in the present instance, the two cartridges disclosed are adapted to fit on a single projector having a movable spindle, therefore requiring the orienting structure 119 on the cartridge to be asymmetrically located.

Edge walls 108 and 110 have, at their upper edges, projecting nibs 124 and 126. These nibs enter corresponding recesses in part 102 as the cartridge is assembled. Ribs 128 may be provided on edge walls 108 and 110 for entering the space between two reel flanges to limit clockspringing of film material on the reel.

Projecting inwardly toward each other from edge walls 108 and 110 are a pair of guide members or flanges 130 and 132. The guide members are positioned so that their outermost face (as viewed in FIG. 6) is recessed from the outer surface of wall 106. Guide members 130 and 132 function to guide a wall on cartridge part 102 into abutting engagement with the upper edge 134 of wall 106. This guiding movement also facilitates insertion of a latch portion on part 120 into opening 120.

Figure 7:
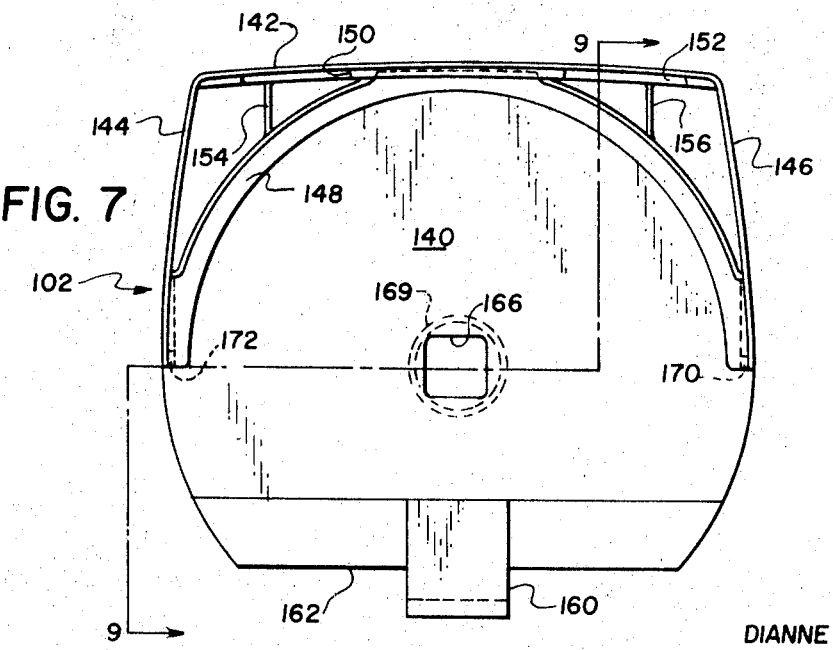
FIG. 7 is an elevation view of a second cartridge part which cooperates with the cartridge part shown in FIG. 6.

Referring now to FIGS. 7 and 9, cartridge part 102 comprises a sidewall 140 and an edge wall projecting outwardly therefrom along the top edge and two adjacent side edges of wall 140. The top edge wall portion is designated 142 and the other two portions thereof are indicated at 144 and 146. Supported by the edge wall portions are a pair of projecting rails 148 adapted to enter the space between reel flanges as described earlier in connection with the similar rails on the other cartridge parts. Edge wall 142 has two elongate, spaced slots 150 and 152 adjacent the edge of the end wall opposite from side wall 140. These slots receive the projecting tongues 112 and 114 on the upper edge of the wall 104 and form part of the latching structure of this invention. In order to guide the tongues into their respective slots, guide means shown in the form of ribs 154 and 156 are provided between rails 148 and edge wall 142 with the upper edge of such guide ribs being immediately adjacent the slots and intermediate the ends of slots. Thus, as the tongues move upwardly they engage the guide ribs and slide along such ribs and into the slots.

An integrally formed latch finger 160 projects from the inner face of wall 140 and extends below the lower edge 162 of the rest of wall 140. Edge 162 is engageable with guide members 130 and 132 on cartridge part 100 during assembly of the cartridge to bring edge 162 on wall 140 into abutting engagement with edge 134 on wall 106. Because the guide members 130 and 132 are spaced apart and do not extend into the space above opening 120 in wall 106 the latch finger 160 is free to pass between the guide members and behind the upper portion of wall 106 during such assembly. At the lower end of finger 160 there is a latching portion designated 164 which projects outwardly from the adjacent portions of finger 160 and is adapted to fit within opening 120 for latching the cartridge parts together. Finger 160 and/or at least the portions of wall 140 adjacent thereto are flexible enough to allow inward movement of finger 160 and latching portion 164 for disengagement of the latch structure and separation of the cartridge parts.

Cartridge part 102 has a rectangular opening 166 which is aligned with opening 116 in wall 104 to accommodate a projector spindle. Mating structure may be provided on the cartridge parts for effecting vertical stacking of cartridges. This structure is illustrated as a projecting annular rim 169 on the outer surface of part 102 around the opening 166. Rim 169 is dimensioned so that it will enter the circular opening 116 in wall 104 of a cartridge placed over the part 102. A similar rim may be provided on the earlier described embodiment. The bottom edge of each cartridge is flat for vertical positioning of cartridges in side-by-side relation.

The lower end portion of edge walls 144 and 146 each have openings or recesses therein designated 170 and 172 which receive the nibs 124 and 126 during assembly of the cartridge parts. The cooperation between the nibs and the recesses limit lateral movement of the parts with respect to each other along the interface between the cartridge parts.

The invention has been described in detail with particular reference to preferred embodiments thereof, but it will be understood that variations and modifications can be effected within the spirit and scope of the invention.

We claim:

1. A cartridge for rotatably receiving a reel of strip material, the cartridge comprising:

two cartridge parts, each of said parts comprising two spaced and generally parallel sidewalls joined by an edge other, the side and edge walls of each cartridge part defining a recess therein located so that said parts are positionable in abutting relation with the recesses therein communicating with each other to jointly define a chamber for a reel of strip material; and latch means carried by said cartridge parts for fastening said parts together with the recesses therein communicating with each other, said latch means comprising
  1. means defining an opening in each sidewall of a first one of the cartridge parts, and
  2. a latch member carried by each sidewall of the other cartridge part and having latch portions thereof positioned in said openings in the first cartridge part when the parts are assembled together for securing said parts together, said portions of said latch member being movable into and out of said openings during assembly and disassembly, respectively, of said cartridge parts.

2. A cartridge as set forth in claim 1 wherein each of said latch members carried by said other cartridge part comprises a flexible finger positionable between said sidewalls of said first one of said cartridge parts, said latch portions of said latch members being located on said fingers.

3. A cartridge as set forth in claim 1 wherein one of said latch members is substantially centrally located on the sidewall of said other cartridge part, and said latch members are flexible to permit movement of said latch portions into and out of said openings.

4. A cartridge as set forth in claim 1 wherein said edge wall of each of said cartridge parts is stepped from one sidewall to the other sidewall, said edge wall of one cartridge part being complementary to the corresponding edge wall of the other cartridge part so that edge walls mate with each other when said parts are assembled together.

5. A cartridge for a reel of strip material adapted to be rotated within the cartridge, the cartridge comprising:

a first cartridge part comprising a first wall forming one side of the cartridge and a second wall forming only a portion of a second side of the cartridge, wall means positioned between said first and second walls for positioning said walls in spaced relation and in generally parallel planes to define therebetween a portion of a chamber for receiving a reel of strip material, said first wall having along an edge thereof spaced from said second wall of pair of tongue members spaced from each other, and the second wall having an opening therein for receiving latch structure; and a second cartridge part comprising a first sidewall and an edge wall extending along one end of first cartridge part and partially along each of two adjacent edges of said cartridge part, said edge wall having a pair of elongate spaced slots extending therethrough for receiving said tongue members on the first cartridge part when the parts are assembled together, and said sidewall of the second cartridge part having a latch finger extending therefrom at an edge thereof opposite from said slot, and said finger having a latching portion positionable within said opening said second wall of the first cartridge wall when the parts are assembled together for securing said parts in assembled relation, said sidewall of said second cartridge part being flexible in the area of said finger to permit flexing of said finger for moving said latching portion into and out of said opening in said second wall during assembly and disassembly of the parts.

6. A cartridge as set forth in claim 5 further comprising guide means carried by said second cartridge part adjacent to said slots therein, said guide means being positioned to be engageable by said tongue members on the first cartridge part for guiding said tongue members into said slots.

7. A cartridge as set forth in claim 5 further comprising guide means carried by said first cartridge part adjacent to one edge of the second wall thereof, said guide means being engageable by a portion of said sidewall of said second cartridge part for guiding such wall into abutting relation with an edge of said second wall of the first cartridge part.

8. A cartridge as set forth in claim 5 wherein one of said cartridge parts has a portion on one face thereof adapted to mate with a cooperating portion on another face of a similar cartridge to interlock the cartridges when they are stacked on top of each other.

9. A cartridge for rotatably receiving a reel of strip material, the cartridge comprising:

two cartridge parts, each of said parts comprising two spaced and generally parallel sidewalls joined by an edge wall, the side and edge walls of each cartridge part defining a recess therein located so that said parts are positionable in abutting relation with the recesses therein communicating with each other to jointly define a chamber for a reel of strip material; and latch means carried by said cartridge parts for fastening said parts together with the recesses therein communicating with each other, said latch means comprising 1. means defining a first opening in one sidewall of one of the cartridge parts,
2. means defining two additional openings in the other sidewall of said one cartridge part, said additional openings being spaced from each other,
3. a first latch portion carried by one sidewall of the other cartridge part, said first latch portion being positioned in said first opening when the parts are assembled together for securing said parts together, said first latch portion being movable into and out of said first opening during assembly and disassembly, respectively, of said cartridge parts, and
4. two additional latch portions carried by the other sidewall of the other cartridge part, said additional latch portions being spaced from each other and being movable into and out of said additional openings during assembly and disassembly, respectively, of said cartridge parts.

* * * * *